April 7, 1925.
A. J. KERCHER
WATER HEATER
Filed April 10, 1923
1,532,903
FIG. 1.
FIG. 2.
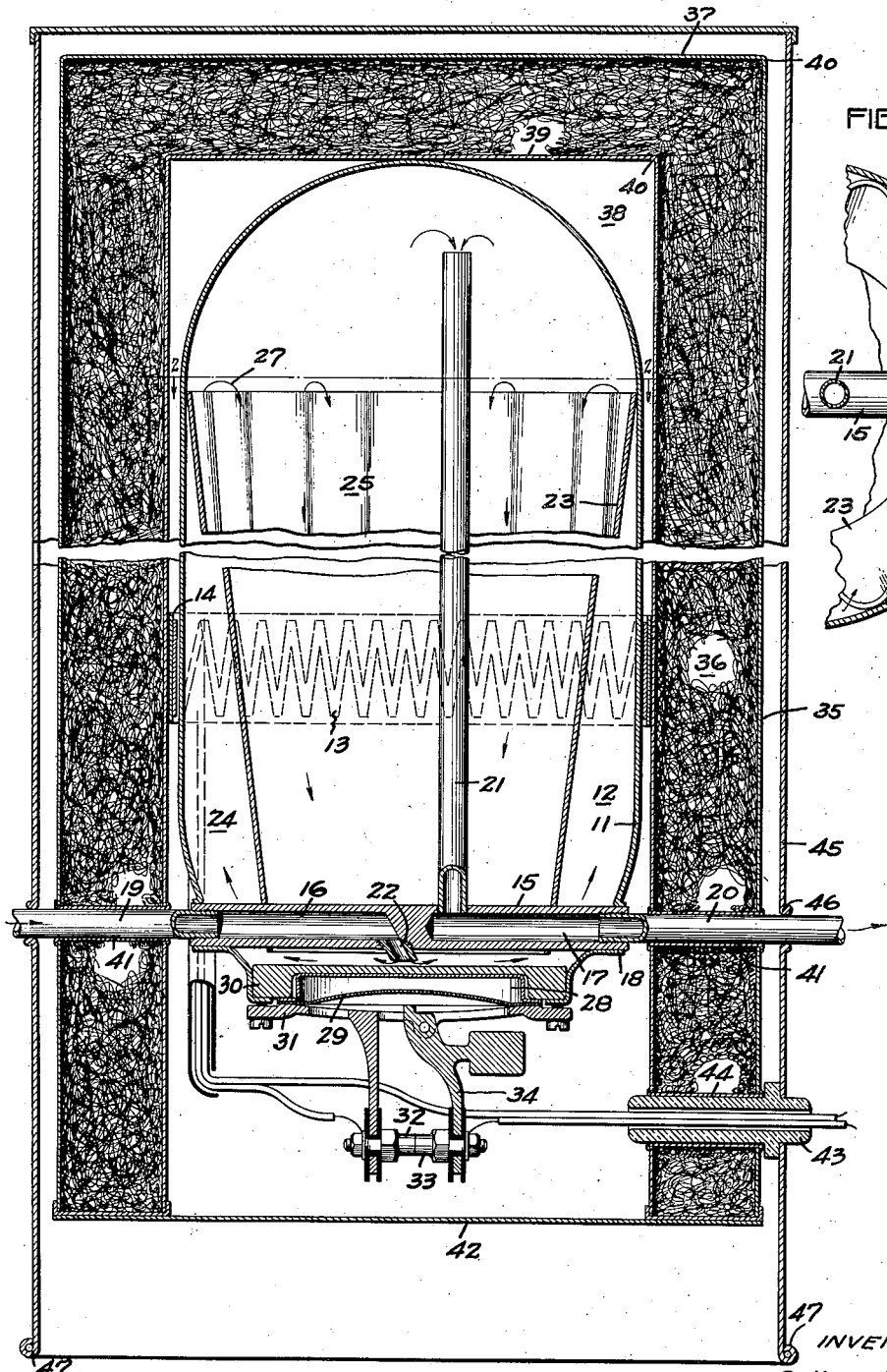
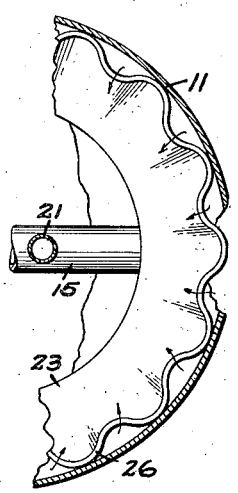
WITNESS:
H. Sherburne.
INVENTOR
Arthur J. Kercher
BY White Prost & Evans
his ATTORNEYS

Patented Apr. 7, 1925.

1,532,903

UNITED STATES PATENT OFFICE.

ARTHUR J. KERCHER, OF BERKELEY, CALIFORNIA.

WATER HEATER.

Application filed April 10, 1923. Serial No. 631,067.

*To all whom it may concern:*

Be it known that I, ARTHUR J. KERCHER, a citizen of the United States, and a resident of the city of Berkeley, in the county of Alameda and State of California, have invented a new and useful Water Heater, of which the following is a specification.

This invention relates to a device for heating water, as by the aid of gas or electricity. More particularly, the invention relates to a system for heating water in which a heat insulated tank is provided, as well as a heating element in good heat conducting relation to the tank.

It is one of the objects of my invention to provide a heating tank that is very efficient in operation, and in order to accomplish this result, I provide a heat insulating covering of a novel form for the tank.

In order that the most simple form of heater be produced, so as to reduce the cost of manufacturing, it is desirable to utilize a tank for the liquid and supply heat directly to the tank, which is purposely made of very good heat conducting material. It is another object of my invention to utilize such a tank, with provisions for maintaining a circulation of the water within the tank so as to render the heating effect most efficient, and to insure uniform heating of the water.

It is another object of my invention to improve and simplify the tank structure and its associated parts.

My invention possesses other advantageous features, some of which with the foregoing, will be set forth at length in the following description, where I shall outline in full that form of the invention which I have illustrated in the drawings accompanying and forming part of the present specification. Although I have shown in the drawings but one embodiment of my invention, I do not desire to be limited thereto, since the invention as expressed in the claims may be embodied in other forms also.

Referring to the drawings:

Figure 1 is a sectional view along the axis of the heater tank, with a part of the tank broken away so as to reduce the overall length of the figure, and Figure 2 is a fragmentary sectional view along plane 2—2 of Fig. 1.

In the present instance I show an upright cylindrical tank 11, preferably made of sheet copper, which holds the water 12 to be heated. In good heat conducting relation with the tank 11 is an electrical heating element 13. The production of heat, however, may be effected by other agencies. In the present instance the heating element 13 is represented as forming a ribbon-like band around the tank 11, and held thereon by any appropriate means, such as a retainer band 14.

The manner in which the water is supplied to the tank 11 and withdrawn therefrom as occasion demands, presents various novel features, which I shall now describe. Extending entirely through the tank 11 near the bottom thereof is a bar-like supporting member 15. This member serves not only as a support for the tank, but is also provided with apertures 16 and 17 which serve to form a path for the intake and outlet of the tank. These apertures may conveniently be produced by drilling the member 15 from opposite ends. In order to make a leakproof connection, the ends of bar 15 are fastened as by brazing to the walls of the tank 11, as indicated at 18.

The inlet pipe 19 connects to aperture 16 as by threading into the end thereof, while the outlet pipe 20 may similarly be connected to the aperture 17. Communicating with the aperture 17 is a pipe 21 that extends nearly to the domed top of tank 11, whereby the liquid is withdrawn from the top of the tank through the outlet pipe 20. A short nipple or spout 22, directed downwardly, may be used in connection with the inlet aperture 16, so that the cold water is introduced substantially at the bottom of tank 11. In order to produce a circulation within the tank, I provide an inset 23 which separates the interior of tank 11 into an outer space 24 and an inner space 25. This inset has in the present instance the general form of a hollow frustrum of a cone with its larger base toward the top of tank 11, and supported near its lower end on the member 15. The top end may be made just large enough in diameter to extend substantially entirely across the inside of the tank 11, and may be provided with flutes 26, as indicated most clearly in Fig. 2, to form passageways for the liquid between it and the inner wall of tank 11. When heat is applied to the outside of tank 11 by the heating element 13, the liquid in the proximity of this element tends to rise, and in so doing it passes upwardly through space 24 and over into the space 25, as indicated by the arrows 27. A circulation is thus set up between the inner and outer spaces 24 and 25 as the heating continues, the warmer water being continually passed, as it is heated, to the inner space 25 and displacing the cooler water which is brought into proximity with the element 13 and has its temperature raised so that it too may rise upwardly in the tank 11.

I prefer to employ an automatic control for the heating element, so that upon the attainment of a sufficiently high temperature, the heating is stopped. For this purpose a thermostat of any well-known construction may be employed, such as a buckling pressure cell 28, having a diaphragm 29 which is adapted to be buckled outwardly upon the attainment of a sufficiently high vapor pressure in the cell. In order to expose the volatilizable liquid in the cell 28 to the influence of the temperature of the water 12 in the tank 11, the cell 28 is enclosed in the metallic casing 30 which virtually forms the tank bottom. A flanged retainer ring 31 holds the cell rigidly in place against this casing, and furthermore serves to support a stationary contact 32. The cooperating movable contact 33 is carried on a weighted lever 34, which may conveniently be pivoted to the ring 31. The arrangement is such that the lever 34 is normally urged so as to connect the two contacts 33 and thus to complete the circuit for the heating element 13, but upon the outward buckling of diaphragm 29 in response to the attainment of a sufficiently high temperature in tank 11, the lever 34 is rotated in a counter-clockwise direction to open the contacts.

One of the important features of my invention resides in the manner in which I insulate the tank against material heat loss by radiation. For this purpose I provide a double walled cover 35 formed of thin sheet metal, between the walls of which there is packed heat insulating material 36. I take especial pains in making the walls tight by appropriate brazing or other means, so that there is no possibility of escape of heated air through the top 37 of this cover 35. There is thus provided a dead space 38 at the top of the tank 11, in which there is no influx or efflux of air. In case the cover 35 is manufactured by attaching the top discs 37 and 39 to the cylindrical tubings forming the inner and outer walls of the cover 35, especial care is taken at the corners 40 where they are attached, so as to form a tight union. Similarly, where pipes 19 and 20 extend through the cover 35, bushings 41 are utilized which effectually prevent communication between the inside of the cover 35, formed by the double walls, and the outside. These bushings 41 also serve to support the cover 35 on the pipes 19 and 20, which are purposely made heavy enough to withstand whatever stress may be placed upon them on this account. The bottom of the cover 35 extends far enough to house the control elements, and a metal covering plate 42 may be appropriately applied to enclose the entire tank 11 and its control. For making the appropriate connections to the element 13, a bushing 43 passing through the cover 35 may be utilized; but in this instance also, a sleeve 44 between the double walls is used for accommodating this bushing, so as to maintain the space between the double walls completely isolated.

It may be noted that the inlet nipple 22 is directed against the inner wall of the thermostat casing 30. In this way the withdrawal of water from the tank 11, which causes water to flow in through this nipple 22, produces an instant reduction of temperature in the proximity of the pressure cell 28, and the heating element 13 is maintained active thereby. This condition continues until the temperature even at the bottom of tank 11 reaches the desired maximum. Instant response of the thermostat to the withdrawal of water from the tank is thus assured.

Although it is possible to support the tank 11 and its cover 35 in a variety of ways, I prefer to utilize for this purpose an element 45 which also serves as a casing for the entire device and telescopes over the cover 35. This casing has a pair of apertures 46 through which the inlet and outlet pipes 19 and 20 may pass, and a rim 47 is formed on the bottom which serves as a base for the entire device. It is thus evident that the heater is in fact supported on pipes 19 and 20 where they pass through apertures 46 and 47. In this way a very simple mechanical arrangement is obtained. The various supporting parts may readily be made sufficiently heavy to take care of the loads imposed.

The manner of constructing the heater it is believed is evident from the foregoing description. The insertion of pipes 19 and 20 into member 15 is accomplished of course only after the cover 35 and casing 45 are in place.

I claim:

1. In a liquid heater, a metallic tank, means for supplying heat to the tank, and means for providing a circulatory path for the liquid in the tank.

2. In a liquid heater, a metallic tank, means for supplying heat to the tank, said means being arranged externally of the tank, and means for dividing the space within the tank to form communicating spaces through which the liquid may circulate as it is heated, the heating means being located in proximity only to some of the spaces.

3. In a liquid heater, a metallic tank, means for supplying heat to the tank, and means within the tank for forming substantially vertical spaces communicating with each other, one of the spaces being partly defined by the inner wall of the tank.

4. In a liquid heater, a metallic tank, means for supplying heat to the tank, and a hollow member within the tank for forming substantially vertical communicating spaces therein.

5. In a liquid heater, a metallic tank, means for supplying heat externally to the tank in a region forming a surrounding band for the tank, and a hollow member within the tank forming substantially vertical annular communicating spaces therein.

6. In a liquid heater, a metallic tank, an electrical heating element forming a band around the tank, and a tubular member within the tank for providing substantially vertical inner and outer communicating spaces.

7. In a liquid heater, a metallic tank, an electrical heating element surrounding the tank, a hollow conical member within the tank for providing inner and outer communicating spaces for the liquid, and means for controlling the electrical heating element.

8. In a liquid heater, a metallic tank, means for supplying heat to the tank, a thermostat near the bottom of the tank for controlling the heating means, means for circulating the water within the tank, an inlet for the tank near the bottom thereof, and an outlet for the tank.

9. In a liquid heater, a metallic tank, means for supplying heat to the tank, a thermostat for controlling the heating means, and an inlet for the tank adapted to discharge liquid near to and toward the thermostat.

10. In a liquid heater, a metallic tank, an electrical heating element external to the tank, a pressure cell for controlling the element disposed in good heat conducting relation to the inside of the tank, and an inlet for the liquid adapted to discharge the liquid against the cell.

11. In a liquid heater, a metallic tank, an electrical heating element external to the tank and disposed at a substantial distance above the tank bottom, a thermostat near the bottom of the tank, means for providing a circulating path for the liquid within the tank, and an inlet for the liquid adapted to discharge the liquid near the thermostat.

12. In combination, a container for a liquid, and means forming an inlet and an outlet for the container, comprising a member extending through the container, said member having apertures extending one from each end of the member and communicating with the interior of the container.

13. In a liquid heater, a tank, and means forming an outlet and an inlet for the tank, comprising a member extending through the tank near the bottom thereof, said member having apertures extending one from each end of the member, one of said apertures opening near the bottom and adapted to discharge the liquid therein, and a tubular extension from the other aperture extending near to the top of the tank for withdrawing the liquid at that point.

14. In combination, a container, a member extending through the container and forming the inlet and outlet for the container, and means cooperating with said member to support the container.

15. In combination, a container, a member extending through the container and forming the inlet and outlet for the container, connections fastening to the member on each end, and a stand for the connections, whereby the entire container is supported by the stand.

16. In combination, a container, a member extending through the container, connections fastening to the member on each end, and a casing for the container having apertures through which the connections extend, said casing having a base portion for supporting the entire container.

17. In combination, a container, a bar-like member extending through the container, said member having threaded apertures extending from its ends and communicating with the interior of the container, for forming the inlet and outlet therefor, pipes threaded into the apertures, and a casing for the container having apertures for the pipes, said casing telescoping over the container and having a base for supporting the container by aid of the pipes passing therethrough.

18. In a liquid heater, a tank, means for heating the tank, and an insulating cover telescoping over the tank, comprising a double walled structure and insulating material between the walls, the space between the walls being tight against communication with the external space, whereby a dead air space is produced between the cover and the tank.

19. In a liquid heater, a tank, means for heating the tank, a cover for the tank telescoping over the tank, and means for supporting the tank and the cover, comprising a member extending through the tank near the bottom thereof, and passing through the walls of the cover, and a stand for supporting the member.

20. In a liquid heater, a tank, means for heating the tank, an insulating cover telescoping over the tank, a member extending through the tank near its bottom, forming the inlet and outlet therefor, a casing telescoping over the cover, said casing having a base for supporting it, and means passing through the casing and cover and attaching to the member that extends through the tank, said means serving to support the cover and tank by the aid of the casing.

21. In a liquid heater, a tank, a ribbon-like electrical heating element forming a band around the tank, a pressure cell thermostat near the bottom of the tank, contacts operated by the thermostat for controlling the element, a hollow conical member within the tank forming an annular space and an interior space therein, whereby circulation of the liquid is effected, a bar extending through the tank near its bottom, said bar having an aperture forming the inlet to the tank and extending from one end of the bar to a central point therein, a nipple communicating with the aperture and directed toward the thermostat, said bar having another aperture forming the outlet and extending from the other end thereof to a central point therein, a tube extending toward the top of the tank and communicating with the outlet aperture, pipes threaded into both apertures, a double walled insulating cover telescoping over the tank and having apertures through which the pipes pass, bushings forming a lining for the apertures in the cover so as to keep the space within the double walls tight, said pipes serving to support the cover, and a casing having a base and telescoping over the cover, said pipes passing through apertures in the casing, said casing serving to support the tank by aid of these pipes.

In testimony whereof, I have hereunto set my hand.

ARTHUR J. KERCHER.